US008712155B2

(12) United States Patent
Tomizawa (10) Patent No.: US 8,712,155 B2
(45) Date of Patent: Apr. 29, 2014

(54) DEVICE FOR IDENTIFYING TYPES OF DOCUMENT FILES

(75) Inventor: Hajime Tomizawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 810 days.

(21) Appl. No.: 12/902,268

(22) Filed: Oct. 12, 2010

(65) Prior Publication Data

US 2011/0102860 A1    May 5, 2011

Related U.S. Application Data

(60) Provisional application No. 61/256,515, filed on Oct. 30, 2009.

(51) Int. Cl.
    *G06K 9/00* (2006.01)
    *G06K 9/46* (2006.01)
(52) U.S. Cl.
    USPC .......................................... 382/181; 382/190
(58) Field of Classification Search
    None
    See application file for complete search history.

(56) References Cited

U.S. PATENT DOCUMENTS

| 6,963,665 | B1* | 11/2005 | Imaizumi et al. | 382/181 |
| 2007/0013967 | A1* | 1/2007 | Ebaugh et al. | 358/448 |
| 2010/0005096 | A1* | 1/2010 | Minagawa et al. | 707/6 |

FOREIGN PATENT DOCUMENTS

JP    2001-318941    11/2001

* cited by examiner

*Primary Examiner* — Jon Chang
(74) *Attorney, Agent, or Firm* — Amin, Turocy & Watson, LLP (57) ABSTRACT

According to one embodiment, a device for identifying types of document files includes an extraction unit, an evaluation unit, and a document type identification unit. The extraction unit extracts document feature information indicating distinguishing information for a document included in a document file. The evaluation unit verifies the validity of the document feature information extracted by the extraction unit. The document type identification unit identifies a type of the document file corresponding to the document feature information extracted by the extraction unit if the document feature information is valid.

17 Claims, 7 Drawing Sheets

Sir......

............................
...........................  — F3

Result of review

☑ Establishment of right necessary

☐ Establishment of right unnecessary

☐ Others

....................

F I G. 4

| Document type | Extraction method of document feature information |
|---|---|
| Written request for application | Obtain writing in the second line |
| Written request for revision of manuscripts | Obtain writing in the third line |
| Written request for review of response to refusal | Obtain writing checked in the middle of document |

F I G. 5

| Document type | Document feature information |
|---|---|
| Written request for application | Written request for application to country A |
| | Written request for application to country B |
| | Written request for application to country C |
| Written request for revision of manuscripts | aa patent office |
| | bb patent office |
| | cc patent office |
| Written request for review of response to refusal | Establishment of right necessary |
| | Establishment of right unnecessary |
| | Others |

DEVICE FOR IDENTIFYING TYPES OF DOCUMENT FILES

CROSS-REFERENCE TO RELATED APPLICATIONS

This application is based upon and claims the benefit of priority from: U.S. provisional application 61/256,515, filed on Oct. 30, 2009, the entire contents of each of which are incorporated herein by reference.

FIELD

Embodiments described herein relate generally to a device for identifying types of document files which identifies, for example, types of document images obtained by scanning, and feature information according to the types of the document images.

BACKGROUND

Document papers recorded in a recording medium such as a recording paper have a plurality of types. The plural types of document papers are respectively read by a scanner to generate document images. Each of the document images undergoes a predetermined process according to the type of the document. If a document image the document type of which is unknown is input, the document processing device identifies the document type of the document image and performs a predetermined process for the document image according to the result of the identification.

A method of automatically identifying document types collectively stored features of plural document types, for example, the sizes of recording media, the number of characters, and the like in a database in advance. If a document image the document type of which is unknown is input, the method compares features of the input document image with the features of document types stored in the database, and searches pertaining document types. A technique regarding a method of identifying documents is disclosed in, for example, JP-A-2001-318941.

DETAILED DESCRIPTION

In general, according to one embodiment, a device for identifying types of document files includes an extraction unit, an evaluation unit, and a document type identification unit. The extraction unit extracts document feature information indicating distinguishing information for a document included in a document file. The evaluation unit verifies the validity of the document feature information extracted by the extraction unit. The document type identification unit identifies a type of the document file corresponding to the document feature information extracted by the extraction unit if the document feature information is valid.

Hereinafter, embodiments of the present invention will be described with reference to the accompanying drawings.

Figure 1:
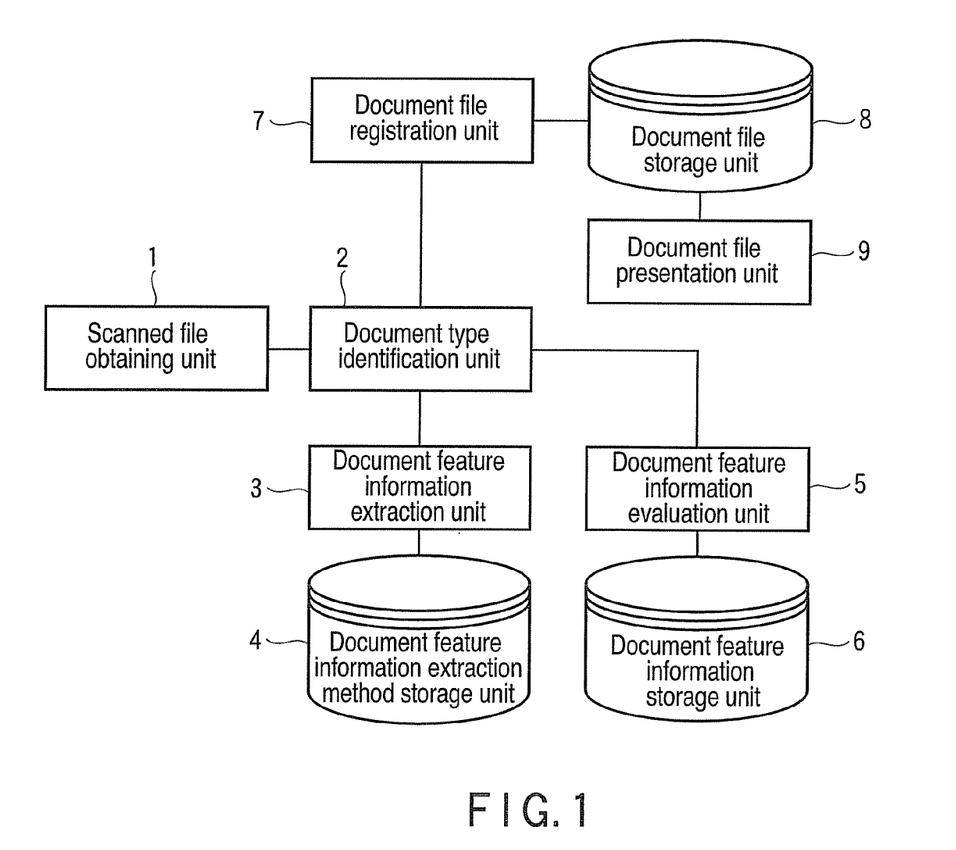
FIG. 1 is a functional block configuration diagram illustrating a device for identifying types of document files according to a first embodiment.

FIG. 1 shows a functional block configuration diagram of a device for identifying types of document files. The device includes a scanned file obtaining unit 1, a document type identification unit 2, a document feature information extraction unit (hereinafter, abbreviated to an "extraction unit") 3, a document feature information extraction method storage unit (hereinafter, abbreviated to an "extraction method storage unit") 4, a document feature information evaluation unit (hereinafter, abbreviated to an "evaluation unit") 5, a document feature information storage unit 6, a document file registration unit 7, a document file storage unit 8, and a document file presentation unit 9.

The scanned file obtaining unit 1 scans a recording medium where a document is recorded to obtain a scanned image, and analyzes the scanned image to obtain a document file including document feature information. The recording medium where a document is recorded includes, for example, a recording paper where a document is recorded. The document feature information indicates distinguishing information for a document included in a document file. The document feature information is decisive information indicating, for example, contents of a document such as a title of the document. The document file is constituted by character information, layout information of characters, or the like. The document file is constituted by, for example, a PDF (portable document format) file, or the like.

The document type identification unit 2 receives the document file from the scanned file obtaining unit 1, and identifies the type of the document file. The type of the document file includes, for example, a written request for patent application, a written request for revision of manuscripts for patent application, and a written request for review of response to reasons for refusals of patent application (written request for review of response to refusal).

The document files are different in document feature information for each type. The document files are different in form for each type. The form is standardized for each type of document file.

Figure 2:
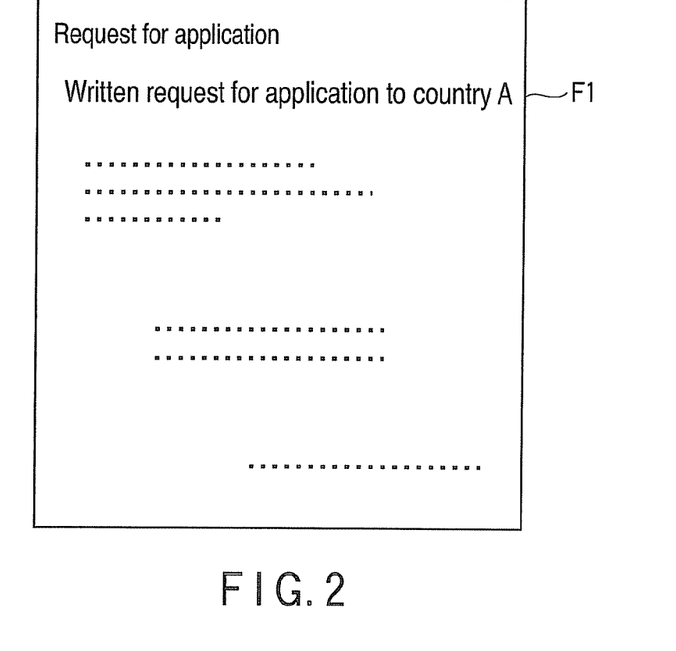
FIG. 2 is a diagram illustrating an example of a form of a written request for application to country A which the device identifies.

The document files include document feature information for each type. For example, the document feature information for the written request for application includes, for example, a written request for application to a country A, a written request for application to a country B, and a written request for application to a country C. FIG. 2 shows an example of a form of, for example, the written request for application to a country A F1. The written request for application to a country A F1 describes "request for application" in the first line and "request for application to a country A" in the second line.

Figure 3:
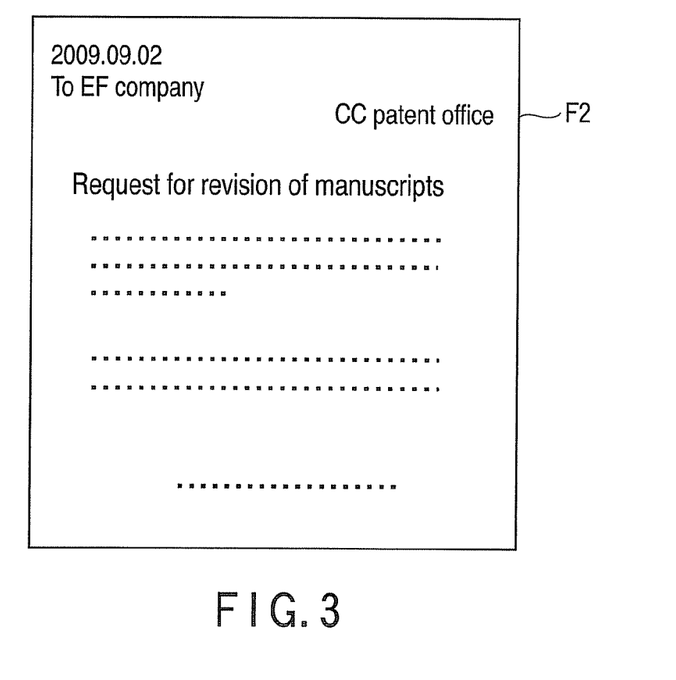
FIG. 3 is a diagram illustrating an example of a form of a written request for revision of manuscripts from cc patent office which the device identifies.

The document feature information for the written request for revision of manuscripts includes, for example, aa patent office, bb patent office, and cc patent office. FIG. 3 shows an example of a form of a written request for revision of manuscripts F2 from, for example, the cc patent office. The written request for revision of manuscripts F2 describes "date" in the first line, "recipient" in the second line, and "cc patent office" in the third line.

Figure 4:
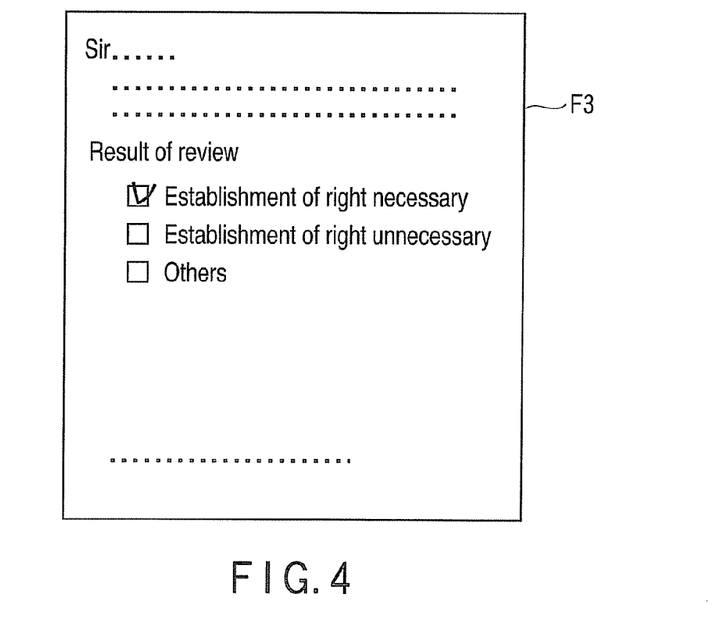
FIG. 4 is a diagram illustrating an example of a form of a written request for review of response to refusal which the device identifies.

The written request for review of response to refusal includes, for example, establishment of a right necessary, establishment of a right unnecessary, and others. The establishment of a right necessary indicates planning to establish a right to patent application. The establishment of a right unnecessary indicates that establishment of a right to patent application is not necessary. FIG. 4 shows an example of a form of a written request for review of response to refusal F3. The written request for review of response to refusal F3 describes writing needing checks, for example, establishment of a right necessary, establishment of a right unnecessary, and others, in the middle thereof.

The extraction unit 3 receives the document file from the scanned file obtaining unit 1 via the document type identification unit 2, and extracts document feature information indicating distinguishing information for the document included in the document file. The extraction unit 3 can read information from the extraction method storage unit 4.

The extraction method storage unit 4 stores extraction method information 100 used to extract document feature information from a document file. The extraction method information 100 defines a plurality of methods for the respective types of document files.

Figure 5:
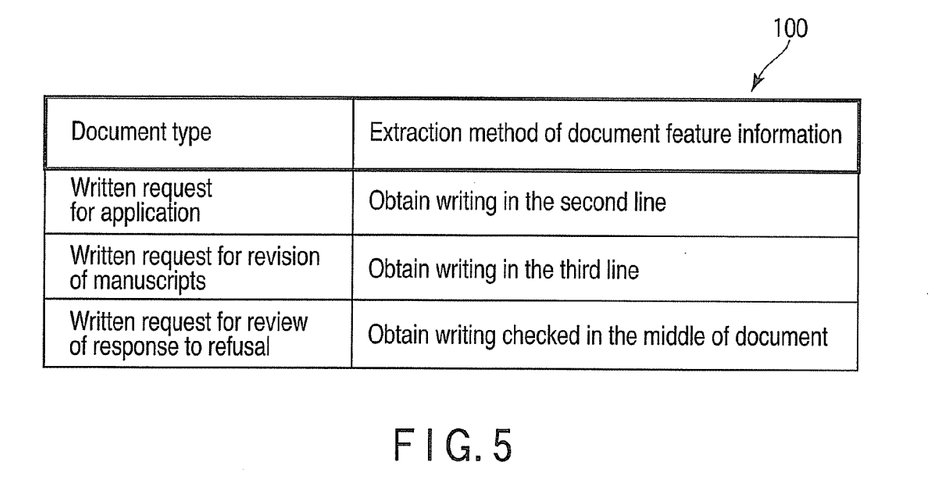
FIG. 5 is a schematic diagram illustrating an example of extraction method information for extracting document feature information from a document using an extraction unit of the device.

FIG. 5 shows a schematic diagram of an example of the extraction method information 100. The extraction method information 100 describes a document type and an extraction method of document feature information as a pair. The extraction method information 100 describes an extraction method of document feature information for each of a written request for application, a written request for revision of manuscripts, and a written request for review of response to refusal, as the document type. The extraction method information 100 describes position information in the document file used to extract the document feature information for the respective types of document files, for example, for each of the written request for application, the written request for revision of manuscripts, and the written request for review of response to refusal. The extraction method for the written request for application is, for example, "to obtain writing in the second line." The extraction method for the written request for revision of manuscripts is, for example, "to obtain writing in the third line." The extraction method for the written request for review of response to refusal is, for example, "to obtain writing checked in the middle of the document."

The extraction unit 3 extracts document feature information from the document file according to the extraction method information 100 stored in the extraction method storage unit 4. Specifically, the extraction unit 3 extracts document feature information by applying all the methods described in the extraction method information 100 stored in the extraction method storage unit 4 to the document file. The extraction unit 3 sequentially assumes the document file as having one of a plurality of types, and extracts document feature information from the document file by the method corresponding to the type in the assumed order. The extraction unit 3 sequentially assumes the document file as, for example, the written request for application, the written request for revision of manuscripts, and the written request for review of response to refusal, and extracts document feature information from the document file by the corresponding methods in the assumed order of the written request for application, the written request for revision of manuscripts, and the written request for review of response to refusal.

The evaluation unit 5 verifies the validity of the document feature information extracted by the extraction unit 3. The evaluation unit 5 verifies the validity of the document feature information extracted by the extraction unit 3 according to reference document feature information stored in the feature information storage unit 6. The evaluation unit 5 can read information from the feature information storage unit 6.

Figure 6:
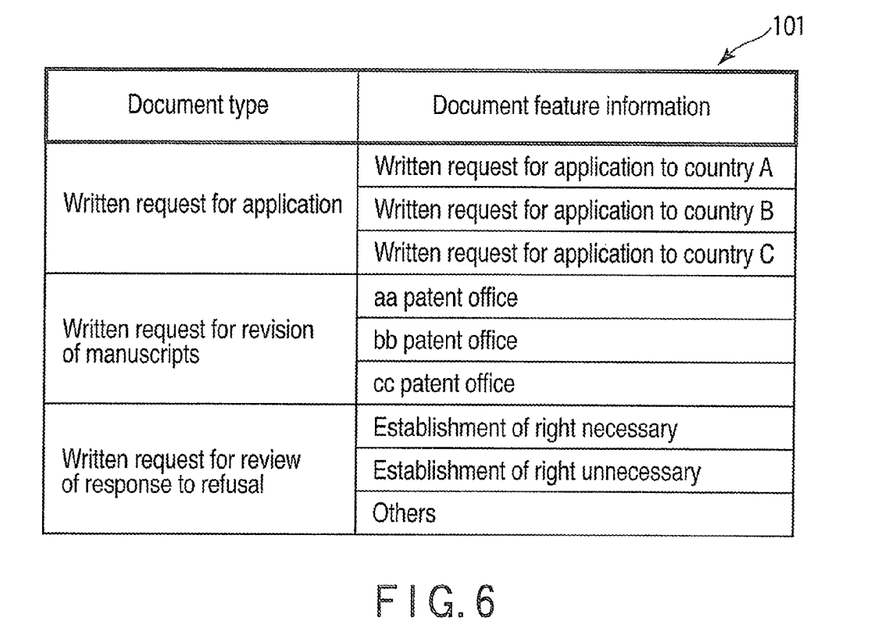
FIG. 6 is a schematic diagram illustrating reference document feature information stored in a feature information storage unit of the device.

The feature information storage unit 6 stores document feature information which is referred to in relation to document feature information to be extracted by the extraction unit 3 for each of the plural types, that is, stores reference document feature information 101. FIG. 6 shows a schematic diagram of the reference document feature information 101 stored in the feature information storage unit 6. The reference document feature information 101 is defined, for example, corresponding to each of the plural types of document files. The reference document feature information 101 defines a pair of a document file and document feature information which is referred to. The reference document feature information 101 describes, as types of document files, the written request for application, the written request for revision of manuscripts, and the written request for review of response to refusal. The document feature information for the written request for application describes, for example, the written request for application to a country A, the written request for application to a country B, and the written request for application to a country C. The document feature information for the written request for revision of manuscripts describes, for example, as patent office, bb patent office, and cc patent office. The document feature information for the written request for review of response to refusal describes, for example, establishment of a right necessary, establishment of a right unnecessary, and others.

The evaluation unit 5 verifies the validity of the document feature information by applying all of the reference document feature information 101 stored in the feature information storage unit 6 to the document feature information extracted by the extraction unit 3.

The document type identification unit 2 identifies types of document files as described above. In this case, if the document feature information is valid as a result of the verification of the validity of the document feature information by the evaluation unit 5, the document type identification unit 2 identifies types of document files corresponding to document feature information extracted by the extraction unit 3.

The document file registration unit 7 stores types of document files identified by the document type identification unit 2 in association with document files and document feature information, in the document file storage unit 8.

The document file presentation unit 9 presents the document files stored in the document file storage unit 8 or both of the document files and the document feature information to the outside. The document file presentation unit 9 presents the document files stored in the document file storage unit 8 along with document file names, the types of document files, or the document feature information associated with the document files, to a user.

Figure 7:
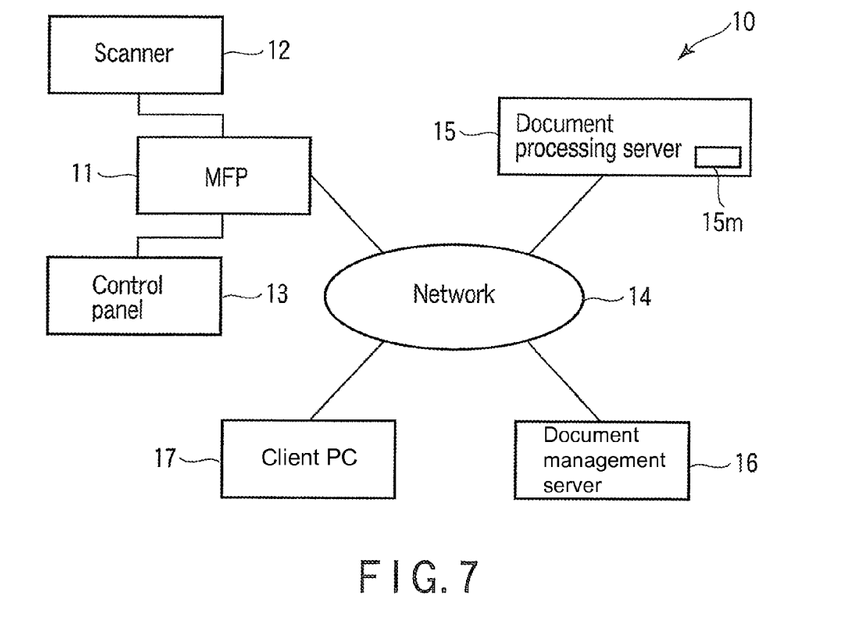
FIG. 7 is a configuration diagram illustrating a document system to which the device is applied.

FIG. 7 shows a configuration diagram of a document system 10 to which the device is applied. The document system 10 includes a digital multi-functional device (hereinafter, referred to as an "MFP") 11. The MFP 11 works as a copier for copying a recording medium where a document is recorded, a printer for printing image data sent from an external device on a recording medium, or the like. The MFP 11 handles three types of written request for application, written request for revision of manuscripts, and written request for review of response to refusal, as the document types.

The MFP 11 is connected to a scanner 12 and a control panel 13. The scanner 12 scans a recording medium where a document is recorded to obtain a scanned image. The control panel 13 sets various types of operations of the MFP 11, for example, by operation of a user. The MFP 11 is connected to a document processing server 15, a document management server 16, and a client personal computer (hereinafter, referred to as a "client PC") 17 via a local area network (LAN) 14. The document processing server 15 performs various types of processes, for example, for document files. The document management server 16 manages, for example, document files. The client PC 17 is, for example, a personal computer used by a client.

The MFP 11 includes the scanned file obtaining unit 1. The document processing server 15 includes the document type identification unit 2, the extraction unit 3, the extraction method storage unit 4, the evaluation unit 5, and the document feature information storage unit 6. The document management server 16 includes the document file registration unit 7, the document file storage unit 8, and the document file presentation unit 9. The client PC 17 includes the document file presentation unit 9. The client PC 17 has a web browser. The client PC 17 can have access to document files and types of document files or document feature information associated with the document files provided from the document file presentation unit 9 through the web browser by operation of a user. The client PC 17 can have access to the document file storage unit 8 to read document files and types of document files or document feature information associated with the document files.

The MFP 11, the document processing server 15, the document management server 16, and the client PC 17 are connected to each other via the local area network 15, and can transmit and receive data to and from each other.

The document processing server 15 has a program memory 15m. The program memory 15m stores a program for identifying types of document files which is readable by a computer mounted on the document processing server 15. The program for identifying types of document files extracts document feature information indicating distinguishing information for a document included in a document file from the document file according to the extraction method information 100 stored in the extraction method storage unit 4, and verifies the validity of the extracted document feature information according to the reference document feature information 101 stored in the document feature information storage unit 6. If the document feature information is valid, the program identifies the type of the document file corresponding to the extracted document feature information.

The extraction method information 100 describes a plurality of methods used to extract document feature information from document files for the respective types of document files.

The reference document feature information 101 is referred to in relation to document feature information to be extracted from a document file for each of the plural types.

In addition, the program of identifying types of document files may be dispersedly stored in one or both of the document processing server 15 and the document management server 16.

A process of scanning a recording medium where a document is recorded and registering a scanned file in the document file storage unit 8 will now be described with reference to a flowchart illustrating identification of types of document files in FIG. 8.

The scanner 12 scans a recording medium where a document is recorded, for example, a recording medium disclosing "to EF company" and "request for revision of manuscripts from the cc patent office" shown in FIG. 3, thereby obtaining a scanned image (ACT 1).

The scanned file obtaining unit 1 receives the scanned image obtained by the scanner 12, and analyzes the scanned image to obtain a document file including document feature information. Specifically, the scanned file obtaining unit 1 performs an optical character recognition (OCR) process for the scanned image (ACT 2).

The scanned file obtaining unit 1 performs the OCR process, obtains layout information indicating where characters are present in the scanned image, and obtains character information indicating what is disclosed. The scanned file obtaining unit 1 combines the scanned image, the layout information, and the character information into one, and creates a document file. A format of the document file is, for example, a PDF file.

The extraction unit 3 sets i=1 so as to count the number of application of the extraction methods of document feature information (ACT 3).

The extraction unit 3 sequentially assumes the document file as having any one of the plural types, and extracts document feature information from the document file by methods corresponding to types in the assumed order. For example, the extraction unit 3 sets, for example, the written request for application in the extraction method information 100 shown in FIG. 5 to i=1, the written request for revision of manuscripts to i=2, and the written request for review of response to refusal to i=3.

The extraction unit 3 applies extraction methods corresponding to all of the document types stored in the extraction method storage unit 4 to a document file the document type of which is unclear (ACTs 4 to 6).

Hereinafter, the extraction method will be described. If the document type of a targeted document file is unclear, the extraction method temporarily assumes the document type and applies an extraction method to the assumed document type.

The extraction unit 3 applies the extraction method for the written request for application set to i=1 to the document file, thereby extracting document feature information (ACT 4). In other words, the extraction unit 3 assumes the document file as the written request for application and applies the extraction method corresponding to the written request for application. The extraction method for the written request for application is, for example, "to obtain writing in the second line" as shown in FIG. 5.

The extraction unit 3 obtains the writing in the second line from the document file of the written request for revision of manuscripts F2 shown in FIG. 3 according to the extraction method "to obtain writing in the second line." The extraction unit 3 obtains "to EF company."

The extraction unit 3 determines whether or not all of the extraction methods (i=3) were applied to the document file of the written request for revision of manuscripts F2 shown in FIG. 3 (ACT 5). As a result of the determination, since the extraction method for the written request for application set to i=1 was applied to the document file, the extraction unit 3 counts up to i=i+1, returns to ACT 4, and applies the extraction method for the written request for revision of manuscripts set to i=2 to the document file, thereby extracting document feature information. In other words, the extraction unit 3 assumes the document file as the written request for revision of manuscripts and applies the extraction method corresponding to the written request for revision of manuscripts. The extraction method for the written request for revision of manuscripts is, for example, "to obtain writing in the third line" as shown in FIG. 5.

The extraction unit 3 obtains the writing in the third line from the document file of the written request for revision of manuscripts F2 shown in FIG. 3 according to the extraction method "to obtain writing in the third line." The extraction unit 3 obtains the character string "cc patent office."

The extraction unit 3 determines again whether or not all of the extraction methods (i=3) were applied to the document file of the written request for revision of manuscripts F2 shown in FIG. 3 (ACT 5). As a result of the determination, since the extraction method for the written request for revision of manuscripts set to i=2 was applied to the document file, the extraction unit 3 counts up to i=i+1, returns to ACT 4, and applies the extraction method for the written request for review of response to refusal set to i=3 to the document file, thereby extracting document feature information. In other words, the extraction unit 3 assumes the document file as the written request for review of response to refusal, and applies the extraction method corresponding to the written request for review of response to refusal. The extraction method for the written request for review of response to refusal is, for example, "to obtain writing checked in the middle of a document" as shown in FIG. 5.

The extraction unit 3 performs the extraction method "to obtain writing checked in the middle of a document" for the document file of the written request for revision of manuscripts F2 shown in FIG. 3. There is no checked writing in the document file of the written request for revision of manuscripts F2 shown in FIG. 3. The extraction unit 3 obtains a "null" result indicating nonexistence of "writing checked in the middle of a document" in the document file of the written request for revision of manuscripts F2.

The extraction unit 3 determines again whether or not all of the extraction methods (i=3) were applied to the document file of the written request for revision of manuscripts F2 shown in FIG. 3 (ACT 5). As a result of the determination, since the extraction method for the written request for review of response to refusal set to i=3 was applied to the document file, the extraction unit 3 determines that all of the extraction methods (i=3) were applied to the document file of the written request for revision of manuscripts F2 shown in FIG. 3.

Figure 9:
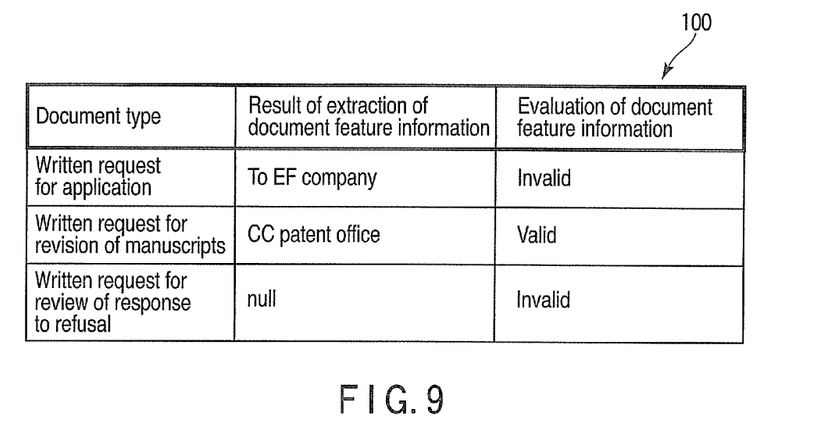
FIG. 9 is a diagram illustrating an example of document feature information extracted by the extraction unit of the device.

FIG. 9 shows an example of the document feature information extracted by the extraction unit 3. When the document file was assumed as the written request for application, "to EF company" is extracted. When the document file was assumed as the written request for revision of manuscripts, the character string "cc patent office" was extracted. When the document file was assumed as the written request for review of response to refusal, the result was "null."

The evaluation unit 5 verifies the validity of the document feature information extracted by the extraction unit 3. The evaluation unit 5 verifies the validity of the document feature information extracted by the extraction unit 3 according to the reference document feature information 101 in FIG. 6 stored in the feature information storage unit 6 (ACT 7). In this case, the evaluation unit 5 applies all of the reference document feature information 101 stored in the feature information storage unit 6 to the document feature information extracted by the extraction unit 3, thereby verifying the validity of the document feature information.

The evaluation unit 5, as shown in FIG. 9, verifies the validity of the string "to EF company" obtained when the document file of the written request for revision of manuscripts F2 was assumed as the written request for application. Referring to the reference document feature information 101 shown in FIG. 6, the document feature information of the written request for application is any one of the written request for application to a country A, the written request for application to country B, and the written request for application to a country C. On the other hand, the document feature information actually obtained is "to EF company" as shown in FIG. 9, which does not correspond to any one of the written request for application to a country A, the written request for application to country B, and the written request for application to a country C. Thus, the evaluation unit 5 evaluates the document feature information of "to EF company" extracted when the document file of the written request for revision of manuscripts F2 was assumed as the written request for application, as not being valid.

The evaluation unit 5, as shown in FIG. 9, verifies the validity of the character string "cc patent office" obtained when the document file of the written request for revision of manuscripts F2 was assumed as the written request for revision of manuscripts. Referring to the reference document feature information 101 shown in FIG. 6, the document feature information of the written request for revision of manuscripts is any one of the aa patent office, the bb patent office, and the cc patent office. At this time, the document feature information actually obtained is "cc patent office" as shown in FIG. 9, which corresponds to one of the aa patent office, the bb patent office, and the cc patent office. Thus, evaluation unit 5 evaluates the document feature information of the "cc patent office" extracted when the document file of the written request for revision of manuscripts F2 was assumed as the written request for revision of manuscripts, as being valid.

The evaluation unit 5, as shown in FIG. 9, verifies the validity of the "null" character string obtained when the document file of the written request for revision of manuscripts F2 was assumed as the written request for review of response to refusal. Referring to the reference document feature information 101 shown in FIG. 6, the document feature information of the written request for review of response to refusal is any one of the three options: the establishment of a right necessary, the establishment of a right unnecessary, or others. On the other hand, the document feature information actually obtained, as shown in FIG. 9, is "null" which does not correspond to any one of the establishment of a right necessary, the establishment of a right unnecessary, or others. Therefore, the evaluation unit 5 evaluates the "null" document feature information extracted when the document file of the written request for revision of manuscripts F2 was assumed as the written request for review of response to refusal, as not being valid.

As a result, the evaluation unit 5 evaluates the character string "cc patent office" obtained when the document file of the written request for revision of manuscripts F2 was assumed as the written request for revision of manuscripts, as being valid.

The document type identification unit 2 receives the evaluation result from the evaluation unit 5 and decides the document type and document feature information of the document file of the written request for revision of manuscripts F2 (ACT 8). As a result of verifying the validity of the document feature information by the assumption of the document type, only the case of assuming the document file as the written request for revision of manuscripts is evaluated to be valid. The document type identification unit 2 decides that the document type of the document file of the written request for revision of manuscripts F2 is a written request for revision of manuscripts and the document feature information is the cc patent office.

Figure 10:
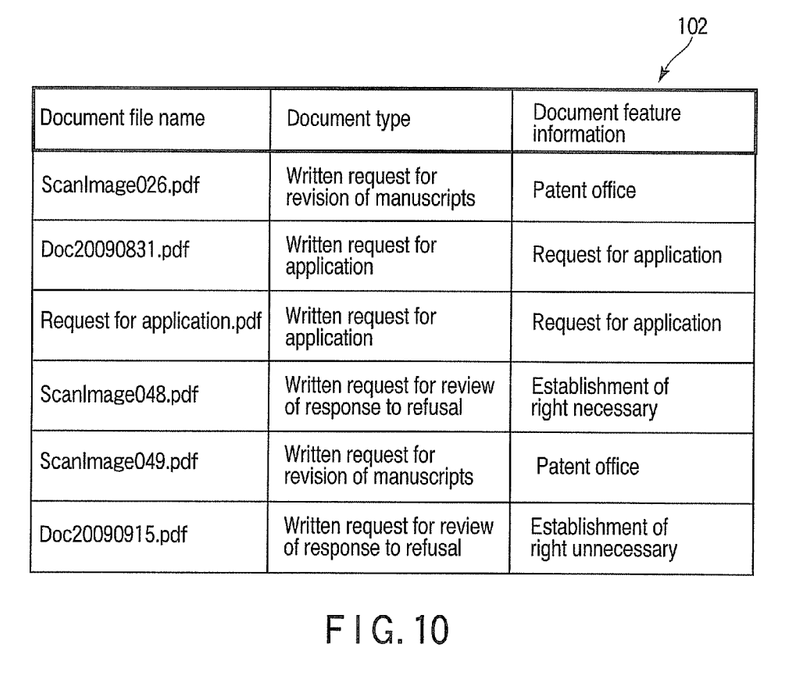
FIG. 10 is a schematic diagram illustrating an example of document file storage information stored in a document file storage unit of the device.

The document file registration unit 7 stores the type of the document file identified by the document type identification unit 2 in association with the document file and the document feature information in the document file storage unit 8 (ACT 9). FIG. 10 shows a schematic diagram of an example of document file storage information 102 stored in the document file storage unit 8. The document file storage information 102 stores a document file name, a document type and document feature information in association with one another.

The document file presentation unit 9 presents document files stored in the document file storage unit 8 to a user along with document file names, types of the document files, or document feature information associated with the document files.

As described above, according to an embodiment, document feature information included in a document file is extracted from the document file according to the extraction method information 100, the validity of the extracted document feature information is verified according to the reference document feature information 101, and if the document feature information is valid, the type of the document file corresponding to the extracted document feature information is identified. Thereby, even if a document file on a recording medium the document type of which is unclear is input, it is possible to simultaneously decide the document type and document feature information of the document file. In the decision of the document type and the document feature information of the document file, there is no need to process two steps of determining the document type of a document file and thereafter of extracting feature information according to the document type.

Upon operation by a user, the document file presentation unit 9 may present the document file names, the types of document files, and the document feature information stored in the document file storage unit 8, to the user. The user can see the types of document files and the document feature information as well as the document file names.

The above-described embodiment may be modified as follows.

Figure 8:
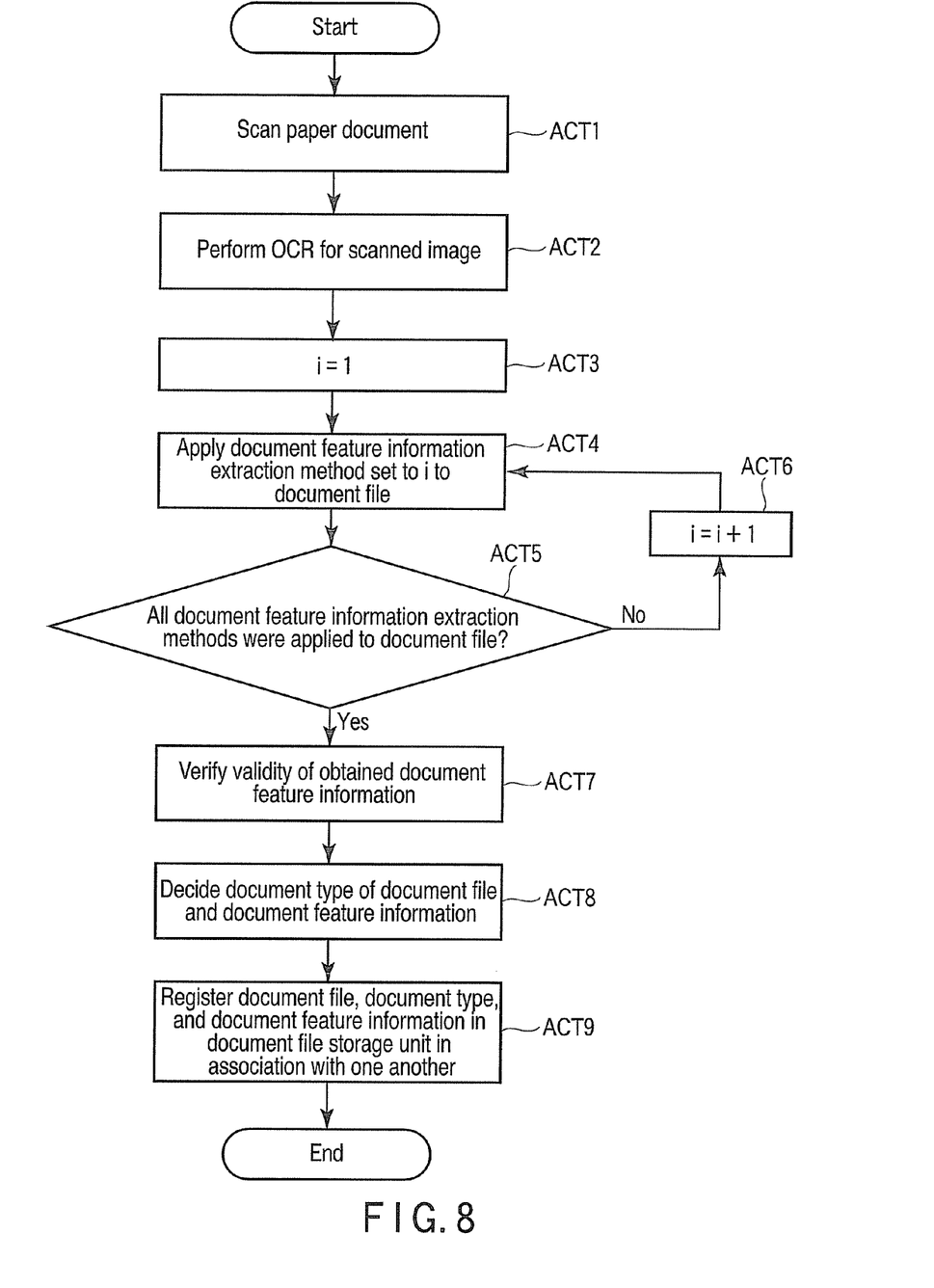
FIG. 8 is a flowchart illustrating a process of identifying types of document files in the device.
Figure 11:
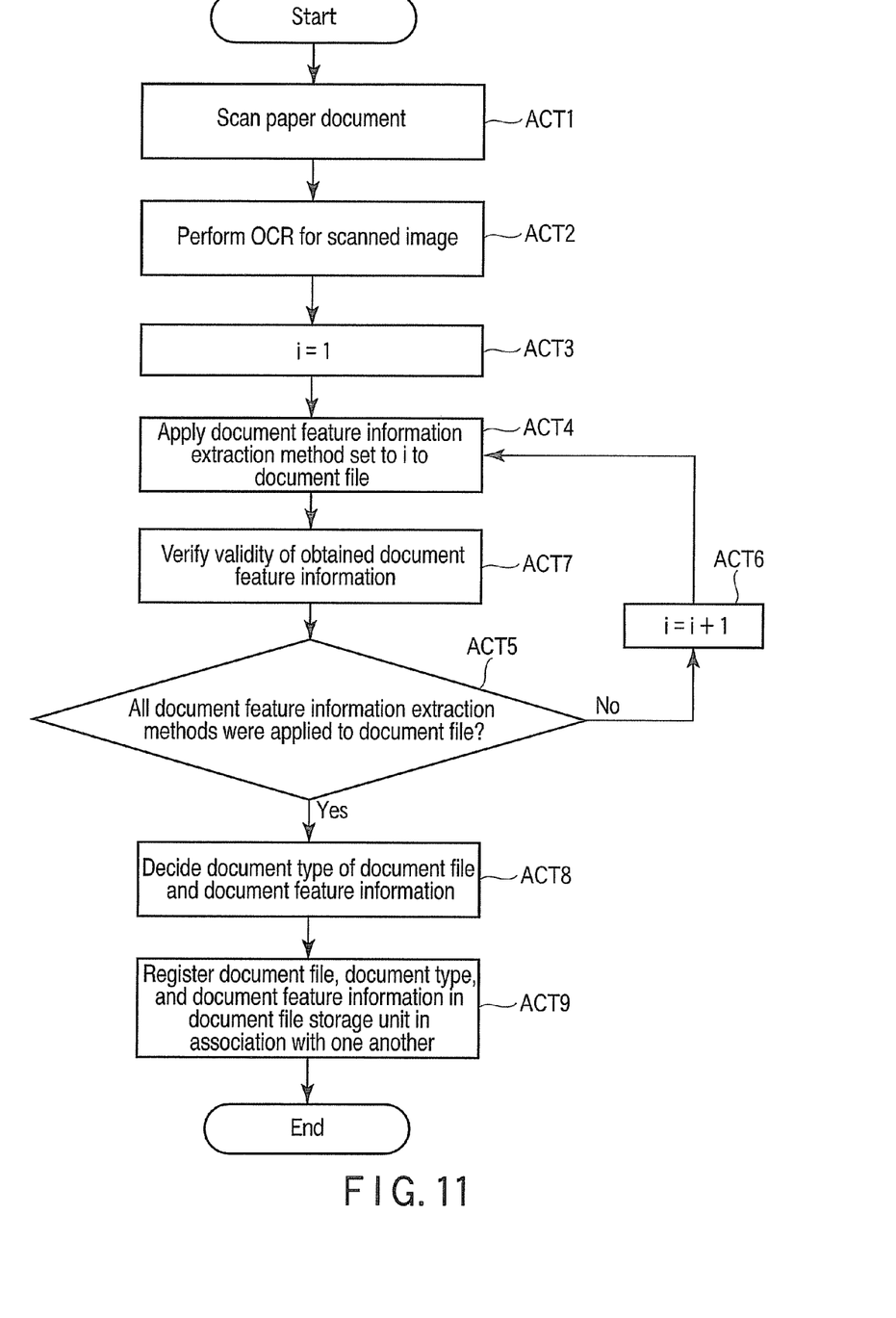
FIG. 11 is a flowchart illustrating a modified example of a process of identifying types of document files in the device.

FIG. 11 shows a modified example of the flowchart illustrating the identification of types of document files in FIG. 8. Differences from the flowchart illustrating the identification of document files shown in FIG. 8 will be described.

The extraction unit 3 applies the extraction method of the written request for application set to i=1 to a document file, thereby extracting document feature information from the document file (ACT 4).

The evaluation unit 5 verifies the validity of the document feature information extracted by the extraction unit 3 according to the reference document feature information 101 in FIG. 6 stored in the feature information storage unit 6 (ACT 7).

The extraction unit 3 determines whether or not all of the extraction methods (i=3) were applied to the document file of the written request for revision of manuscripts F2 shown in FIG. 3, and the validity of the document feature information extracted by all of the extraction methods was verified (ACT 5).

As a result of the determination, if all of the extraction methods (i=3) were applied to the document file, and the validity was not verified, the extraction unit 3 counts up to i=i+1, returns to ACT 4, and applies the subsequent extraction method for the written request for revision of manuscripts to the document file, thereby extracting document feature information.

As a result of the determination, if all of the extraction methods (i=3) were applied to the document file and the validity was verified, the document type identification unit 2 receives the evaluation result from the evaluation unit 5 and decides a document type and document feature information of the document file of the written request for revision of manuscripts F2 (ACT 8).

The types of document files are not limited to, for example, the written request for application, the written request for revision of manuscripts, and the written request for review of response to refusal, but may be applied to recognition of various types of written requests and the like. The document feature information in various types of document files such as the written request for application, the written request for revision of manuscripts, and the written request for review of response to refusal is not limited to the written request for application to a country A, the written request for application to a country B, and the written request for application to a country C shown in FIG. 2, . . . , as patent office, bb patent office, and so on, but may use other distinguishing information in a document file.

The extraction method of document feature information of a document file may change extraction positions in the document file according to each form of each type.

The form of a document file is not limited to the standard. For example, if feature information is to be extracted from a form, character strings before and after a predetermined phrase are extracted as feature information. Thereby, it is possible to implement an extraction method not depending on absolute positions of characters in a document. It is possible to extract feature information even from a non-standardized form.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A device for identifying types of document files comprising:
    an extraction unit that extracts document feature information indicating distinguishing information for a document included in a document file;
    an evaluation unit that verifies the validity of the document feature information extracted by the extraction unit; and
    a document type identification unit that identifies a type of the document file corresponding to the document feature information extracted by the extraction unit if the document feature information is valid,
    wherein the document file is one of a plurality of types, and the document feature information is different for each type,
    wherein the device further comprises an extraction method storage unit that stores extraction method information describing a plurality of methods used to extract the document feature information from the document file for the respective types of the document files, and wherein the extraction unit extracts the document feature information from the document file according to the extraction method information stored in the extraction method storage unit.

2. The device according to claim 1, wherein the document file is one of a plurality of types, and the document feature information is different for each type, wherein the device further comprises a feature information storage unit that stores reference document feature information of the document feature information to be extracted by the extraction unit for each of the plural types, and wherein the evaluation unit verifies the validity of the document feature information extracted by the extraction unit according to the reference document feature information stored in the feature information storage unit.

3. The device according to claim 2, wherein the document file is one of a plurality of types, and the document feature information is different for each type, and wherein the reference document feature information is described corresponding to each of the plural types of the document files.

4. The device according to claim 1, further comprising:

a file obtaining unit that scans a recording medium where a document is recorded to obtain a scanned image, and analyzes the scanned image to obtain the document file including the document feature information;

a document file storage unit;

a document file registration unit that stores the type of the document file identified by the document type identification unit in association with the document file and the document feature information in the document file storage unit; and a document file presentation unit that presents the document file stored in the document file storage unit or both of the document file and the document feature information.

5. The device according to claim 1, wherein the document file is one of a plurality of types, and the document feature information is different for each type, and wherein the extraction method information describes position information in the document file used to extract the document feature information for each type of the document file.

6. The device according to claim 1, wherein the extraction unit applies all of the methods described in the extraction method information stored in the extraction method storage unit to the document file, thereby extracting the document feature information.

7. The device according to claim 1, wherein the extraction unit sequentially assumes the document file as having any one of a plurality of types, and extracts the document feature information from the document file by the method corresponding to the type in the assumed order.

8. The device according to claim 1, wherein the evaluation unit applies all of the reference document feature information stored in the feature information storage unit to the document feature information extracted by the extraction unit, thereby verifying the validity of the document feature information.

9. The device according to claim 1, wherein the document file is one of a plurality of types, and the document feature information is different for each type, and wherein each piece of the document feature information of the plural document files is standardized in a form for each of the plural types of the document files.

10. A method of identifying types of document files comprising:

extracting document feature information indicating distinguishing information for a document included in a document file;

verifying the validity of the extracted document feature information; and identifying a type of the document file corresponding to the extracted document feature information if the document feature information is valid, wherein the document file is one of a plurality of types, and the document feature information is different for each type, wherein the method further comprises storing extraction method information which describes a plurality of methods used to extract the document feature information from the document file for the respective types of the document files, in an extraction method storage unit, and wherein the extraction of the document feature information includes extracting the document feature information from the document file according to the extraction method information stored in the extraction method storage unit.

11. The method according to claim 10, wherein the extraction method information describes position information in the document file used to extract the document feature information for each type of the document file.

12. The method according to claim 10, wherein the document file is one of a plurality of types, and the document feature information is different for each type, wherein the method further comprises storing reference document feature information of the document feature information to be extracted for each of the plural types, in a feature information storage unit and wherein the verification of the validity includes verifying the validity of the extracted document feature information according to the reference document feature information stored in the feature information storage unit.

13. The method according to claim 12, wherein the reference document feature information is described corresponding to each of the plural types of the document files.

14. The method according to claim 12, wherein the verification of the validity includes applying all of the reference document feature information stored in the feature information storage unit to the extracted document feature information, thereby verifying the validity of the document feature information.

15. The method according to claim 10, further comprising:

scanning a recording medium where a document is recorded to obtain a scanned image;

analyzing the scanned image to obtain the document file including the document feature information;

storing the identified type of the document file in association with the document file and the document feature information in a document file storage unit; and presenting the document file stored in the document file storage unit or both of the document file and the document feature information.

16. The method according to claim 10,
wherein the extraction of the document feature information includes applying all of the methods described in the extraction method information stored in the extraction method storage unit to the document file, thereby extracting the document feature information.

17. The method according to claim 10,
wherein the extraction of the document feature information includes sequentially assuming the document file as having any one of a plurality of types, and extracting the document feature information from the document file by the method corresponding to the type in the assumed order.

* * * * *